W. T. BENHAM.
DIAL FOR COMBINATION LOCKS.
APPLICATION FILED DEC. 21, 1914.
1,158,969.
Patented Nov. 2, 1915.
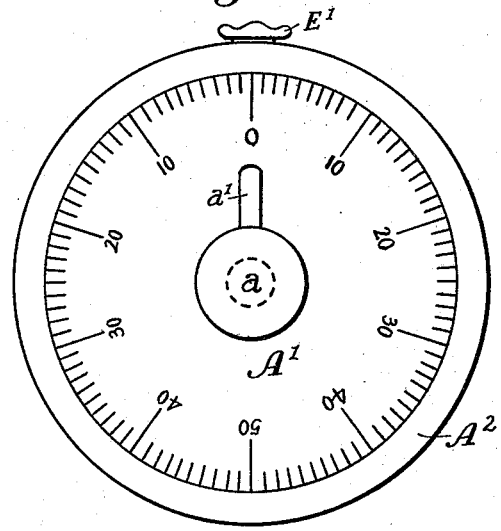
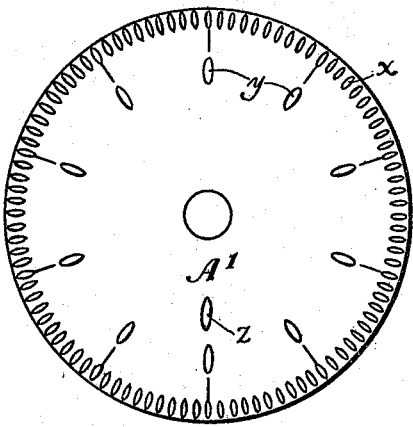
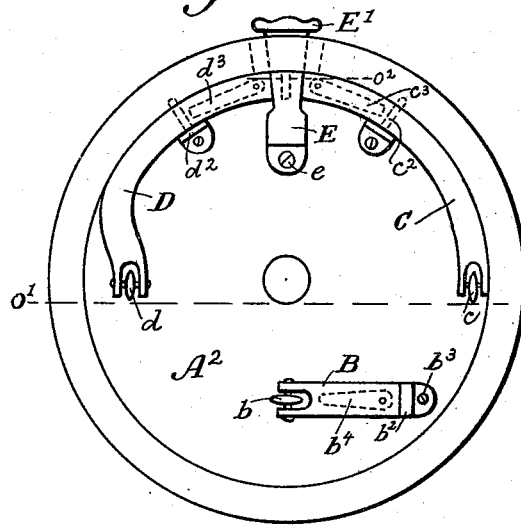
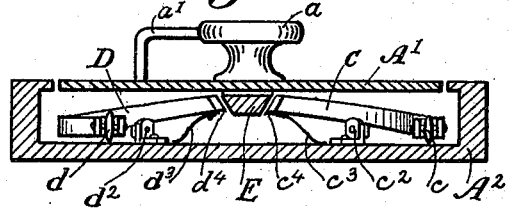
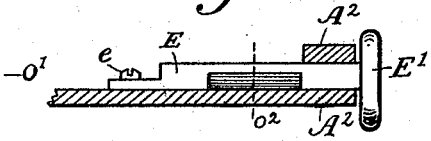
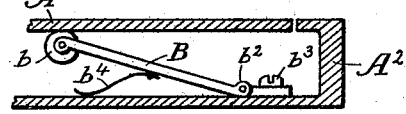
WITNESSES:
A. L. Tildesley
Lewis M. Hosea
INVENTOR.
William T. Benham
BY
Walter A. Knight
ATTORNEY.

UNITED STATES PATENT OFFICE.

WILLIAM T. BENHAM, OF NORWOOD, OHIO.

DIAL FOR COMBINATION-LOCKS.

1,158,969. Specification of Letters Patent. Patented Nov. 2, 1915.

Application filed December 21, 1914. Serial No. 878,341.

*To all whom it may concern:*

Be it known that I, WILLIAM T. BENHAM, a citizen of the United States, residing at Norwood, in the county of Hamilton and State of Ohio, have invented new and useful Improvements in Dials for Combination-Locks, of which the following is a specification.

My improvements relate to dials for combination locks, such are are used on safes, cabinets and the like; and may be employed with such dials already in use; and any combination lock so equipped can easily be run, in dim light or absolute darkness, by one who knows the combination. The additional cost will be moderate, and the scope of use for combination locks with their manifest advantages, will be greatly extended,—as for example, the doors of garages, storerooms, file-rooms, etc.

In the preferred form of my invention, there will be substantially no change in appearance from the dials now ordinarily used, for the mechanism will be placed under and operate on the back of the dial; and only the end of a small lever will be exposed.

My improvements embody fundamentally a rotatable dial having suitable gage notches (which may be either on the front or the back of the dial); an indicator adapted to contact with the zero-notch at each revolution of the dial in either direction; an indicator normally out of contact with the units gage notches, but adapted to be pressed into contact therewith; a corresponding indicator normally out of contact with the group gage notches (as of tens of units), but adapted to be pressed into contact therewith; and unitary means for pressing either of these two last-mentioned indicators into contact position at the will of the operator. These improvements are applied preferably to the under side of the rotatable dial, in which case the dial structure will have substantially the appearance of the ordinary dial adapted to be run only by sight; or they may be applied to the outer surface of the rotatable dial. In the preferred form, the added parts are beneath and concealed by the dial face, entirely out of the way where they could not be readily tampered with or clogged with dirt. The function of the improvements being to enable the operator to read the gage by the sense of touch or hearing, the combination may be made and used without resort to the sense of sight, if desired.

If the dial is visibly numbered at all, I prefer to number the gage marks each way from zero, as set forth in Letters Patent No. 1,113,865, issued to me October 13, 1914, as this is the method of counting and running any given combination used with my improvements. Elevations or "ribs," instead of depressions, may be used as gage marks.

My invention is illustrated in the accompanying drawings, in which—

Figure 1 is a plan or face view of the dial structure, in which the special mechanism of my invention is applied to the underside of the rotating dial plate and therefore not visible in the figure except the terminal button of the shifter lever; Fig. 2 is a plan or face view of the underside of the rotating dial plate removed; Fig. 3 is a face view, corresponding with Fig. 1, of the dial casing with the dial plate removed, showing the pivoted levers in position to act upon the underside of the dial plate; Fig. 4 is a cross section, shown in elevation, of the dial structure, including the dial plate and casing, taken on the dotted line $o^1$ with the finger piece sectioned on the line $o^2$, both of Fig. 3 and of $o^2$ of Fig. 5. The dial stem is cut away flush with the under-surface of the dial plate. Fig. 5 is a side elevation of the shifter in relation to the dial casing shown in section; and Fig. 6 is an elevation of the zero indicator in position contacting with the underside of the rotating dial.

Referring now to the drawings, $A^1$ is a rotatable lock-dial with the usual knob $a$ and a fin $a^1$ to facilitate accurate rotation; and $A^2$ designates its fixed casing. The visible gage of the dial for sight reading is of the usual type, except that it is numbered each way from zero upward as already indicated. The underside of the dial $A^1$ has three separate series of gage notches concentrically arranged in circles one within the other. The outer one of these, $x$, indicates single units; those in the next circle, $y$, indicate groups of tens of units; and the inner one is a single notch $z$, which indicates zero, or the starting point in the count; but, because of the placing of the indicator intended to contact with it below the center of the dial, said notch, $z$, is placed on the same radius extended as the unit indication 50 on the face of the dial.

The zero indicator comprises a small wheel $b$ journaled in the fork of the lever B which is hinged at $b^2$ and fastened to the bottom of the dial casing at $b^3$. The wheel end of the lever B is held outward so as to constantly contact with the underside of the dial by the spring $b^4$, and the lever B is located in such a position that the wheel $b$ contacts with the dial on the inner gage circle $z$, in which the zero depression $z$ is formed.

The units indicator comprises a small wheel $c$ journaled in the forks of the curved lever C which is pivoted at $c^2$ to the dial seat. The wheel end of the lever C is held inward normally out of contact with the underside of the dial by the spring $c^3$. The opposite end $c^4$ of the lever C (Fig. 4) is beveled to so contact with the oppositely beveled side of the shifter E that the movement of the shifter against it depresses this end of the lever and throws the wheel $c$ outward against the under-surface of the dial $A^1$. The lever C is fastened to the bottom of the dial-casing in such a position as to make the wheel $c$ contact with the under-surface of the dial on the outer circle in which the units notches are cut.

The tens indicator, with its wheel $d$, curved lever D pivoted at $d^2$ to the bottom of the dial-casing, its spring $d^3$ and beveled end $d^4$ are all similar to like parts on the units indicator mechanism arranged for the opposite semicircle of the dial; but the lever itself is so bent as to make the indicator wheel $d$ contact with the under-surface of the dial on the intermediate circle $y$ in which the tens notches are cut.

The shifter E is a lever formed as shown in Figs. 3 and 5, pivoted to the bottom of the dial casing at $e$, and extends thence radially outward between the inner ends of the levers C and D, through the annular side wall of the dial casing, in a suitably formed slot to admit a limited lateral play in its fixed plane of movement, when pushed in either direction by the finger of the operator pressed against the terminal button $E^1$. At its underside, the outer edges of the shifter are beveled outwardly, these beveled surfaces occupying the relation to the correspondingly beveled ends of the levers C, D, shown in Fig. 4.

The normal upward tension at the contiguous ends of the levers, C, D, tends to hold the shifter E in a central position; but when pressed sidewise it rides upon and forces down the contact end of one of the levers which brings the indicator wheel thereof into contact with the underside of the dial. Upon rotation of the dial under these conditions the "click" and slight jump of the wheel as it passes over the graduations indicates each one to the ear and touch without the aid of sight; thus enabling the operator to "run the combination" with ease and certainty; while the "click" and jump of the zero indicator always independently indicates when the beginning mark is reached or passed.

The mode of operation is simple and will further illustrate the functional advantages of the invention. Entire revolutions may be made in the usual way by using the central knob $a$, exactitude being indicated by the slight check of movement and the sound produced by the indicator B; but the fin $a^1$ may be employed to assist in rotating the dial because its vertical position, which coincides with the indicator sound and check of movement, renders the aid of sight quite unnecessary. Partial rotations of the dial in either direction are indicated to the sense of touch and hearing, provided the shifter E is first moved to the right to set the indicator $c$ in contact with the dial, and so held during the movement—which indicates to touch and hearing the number of unit graduations. Rotation in either direction over space graduations of groups of units is indicated in like manner by moving the shifter E to the left, thus setting the indicator $d$ into contact with the dial on the circle in which group graduations are placed. While therefore these means of indication to the senses of touch and hearing are complete and sufficient in themselves and render sight unnecessary, yet, as shown herein, they do not interfere with the use of sight alone; or may be used only as an adjunct for use in special emergencies.

Points instead of wheels may be used for indicators, but I prefer wheels because the wear is less and no noise will be made loud enough to enable a bystander to observe closely and learn the combination number although not in position to read it on the dial by sight.

I claim as my invention and desire to secure by Letters Patent of the United States:

1. In a combination lock, a rotatable dial provided with graduations upon its surface arranged in concentric circles representing, respectively, single units, uniform groups of units, and the starting point in the count; an indicator adapted to contact with the starting point graduation at each revolution of the dial in either direction; an indicator normally out of contact with the units gage graduations; an indicator normally out of contact with the group gage graduations, and unitary means for pressing either of said two last mentioned indicators into position to contact with their respective graduations.

2. In a combination lock, a rotatable dial provided with graduations upon its surface, arranged in concentric circles and representing, respectively, single units, uniform groups of units, and the starting point in the count; two contact indicators, one each for the unit and for the unit-group graduations, both normally out of contact, but each adapted to be moved into and held at will in contact with the graduated surface of the dial; means whereby either of the single units and units group indicators may be held in contact with their respective graduations; and an indicator constantly in contact with the dial surface on the circle in which the starting point graduation is located; all of said indicators for the purpose of indicating to the operator, otherwise than by sight, the passing of the dial graduations over the indicators in the rotation of the dial.

3. In a combination lock, a rotatable dial provided with depressed graduations, arranged in concentric circles, representing respectively, single units, given groups of units, and the starting point in the count, with two contact indicators, one each for the unit and for the unit-group graduations normally out of contact, but adapted to be moved and held temporarily in contact, and an indicator always in position to contact with the starting point graduation.

4. In a combination lock of the character indicated the combination of controllable indicators arranged to contact at will with the units and group series of graduations of the rotatable dial, and a relatively fixed indicator in constant contact with the dial surface at the circle of the zero or starting point graduation to indicate complete rotations of the dial.

In testimony whereof I have hereunto set my hand in presence of two subscribing witnesses.

WILLIAM T. BENHAM.

Witnesses:
A. L. TILDESLEY,
LEWIS M. HOSEA.

Copies of this patent may be obtained for five cents each, by addressing the "Commissioner of Patents, Washington, D. C."